United States Patent
Eguchi

(10) Patent No.: US 10,279,859 B2
(45) Date of Patent: May 7, 2019

(54) SADDLE-TYPE VEHICLE

(71) Applicant: SUZUKI MOTOR CORPORATION, Hamamatsu-Shi, Shizuoka-Ken (JP)

(72) Inventor: Teppei Eguchi, Hamamatsu (JP)

(73) Assignee: SUZUKI MOTOR CORPORATION (JP)

( * ) Notice: Subject to any disclaimer, the term of this patent is extended or adjusted under 35 U.S.C. 154(b) by 0 days.

(21) Appl. No.: 15/292,342

(22) Filed: Oct. 13, 2016

(65) Prior Publication Data
US 2017/0101156 A1  Apr. 13, 2017

(30) Foreign Application Priority Data
Oct. 13, 2015 (JP) ................................ 2015-201928

(51) Int. Cl.
*B62K 25/18* (2006.01)
*B62K 11/02* (2006.01)
*B62L 1/00* (2006.01)
*B62M 7/12* (2006.01)

(52) U.S. Cl.
CPC .............. *B62K 25/18* (2013.01); *B62K 11/02* (2013.01); *B62L 1/005* (2013.01); *B62M 7/12* (2013.01); *B60Y 2200/12* (2013.01); *B60Y 2304/07* (2013.01); *B60Y 2400/86* (2013.01)

(58) Field of Classification Search
CPC ......... B62K 25/18; B62K 11/02; B62L 1/005; B62M 7/12
USPC ........................................................ 180/223
See application file for complete search history.

(56) References Cited

U.S. PATENT DOCUMENTS

| | | | | |
|---|---|---|---|---|
| 5,524,726 A | * | 6/1996 | Wright, Jr. ............. | B62K 11/10 180/220 |
| 6,349,784 B1 | * | 2/2002 | van der Heide ..... | B62K 21/005 180/219 |
| 7,806,217 B2 | * | 10/2010 | Hasegawa .............. | B62K 25/24 180/219 |
| 8,397,854 B1 | * | 3/2013 | Nam .................... | B62K 25/283 180/210 |
| 2007/0209855 A1 | * | 9/2007 | Burkiewicz ............ | B60B 3/048 180/223 |
| 2008/0202827 A1 | * | 8/2008 | Thiers ...................... | B60G 3/14 180/6.24 |
| 2014/0027998 A1 | * | 1/2014 | Thiers .................... | B62K 21/00 280/276 |
| 2015/0307152 A1 | * | 10/2015 | Van Steenwyk ....... | B60G 3/185 280/276 |

* cited by examiner

*Primary Examiner* — Jacob D Knutson
(74) *Attorney, Agent, or Firm* — Barnes & Thornburg LLP

(57) ABSTRACT

A saddle-type vehicle includes a link-type suspension system configured to make a vehicle support a driving wheel, and a motor configured to rotate the driving wheel. The driving wheel driven by the motor is a steered wheel. The link-type suspension system includes a swing arm having a pair of left and right arm portions that swingably supports the steered wheel. The motor is placed on one of left and right sides of a steering center axis in a width direction of the vehicle. A shock absorber is mounted on another arm portion of the swing arm, the another arm portion being placed on another of the left and right sides of the steering center axis in the width direction of the vehicle.

11 Claims, 14 Drawing Sheets

SADDLE-TYPE VEHICLE

CROSS-REFERENCE TO RELATED APPLICATIONS

This application claims the benefit of priority of Japanese Patent Application No. 2015-201928, filed Oct. 13, 2015, the entire contents of which are incorporated herein by reference.

BACKGROUND OF THE INVENTION

Field of the Invention

The present invention relates to a motor-driven saddle-type vehicle.

Description of the Related Art

A motor-driven vehicle as a saddle-type vehicle is described in Patent Document 1 (Japanese Patent Laid-Open No. 2010-228570) in which a front wheel serving as a steered wheel is rotatably supported by a telescopic front fork in front part of a vehicle body, and a motor adapted to drive the steered wheel and a braking device adapted to brake the steered wheel are placed left and right of a steering shaft in a width direction of the vehicle.

In the motor-driven vehicle described in Patent Document 1, a front wheel, which is a steered wheel, also serves as a driving wheel. Brake discs of the braking device are placed on an inner side of left and right fork legs of the front fork, and the motor is heavier in weight than the braking device. The steered wheel, braking device, and motor are supported directly by lower part of the telescopic front fork. Furthermore, front shock-absorbing mechanisms are provided in the left and right fork legs of the front fork, respectively. In this structure, the motor is placed close to the shock-absorbing mechanisms in the front fork, imposing great constraints on motor layout and size in designing a center of gravity position around the steering shaft appropriately by achieving a left and right weight balance of the vehicle.

SUMMARY OF THE INVENTION

The present invention has been made in consideration of the above circumstances, and an object of the present invention is to provide a motor-driven saddle-type vehicle by optimizing an arrangement of driving parts and suspension parts of the vehicle, maintaining a left and right weight balance of the vehicle, and improving stability of a vehicle body.

The above and other objects can be achieved according to the present invention by providing, in one aspect, a saddle-type vehicle includes a link-type suspension system configured to make a vehicle support a driving wheel, and a motor configured to rotate the driving wheel. The driving wheel driven by the motor is a steered wheel. The link-type suspension system includes a swing arm having a pair of left and right arm portions that swingably supports the steered wheel. The motor is placed on one of left and right sides of a steering center axis in a width direction of the vehicle. A shock absorber is mounted on another arm portion of the swing arm, the another arm portion being placed on another of the left and right sides of the steering center axis in the width direction of the vehicle.

Since the driving wheel is swingably supported by the swing arm of the link-type suspension system and the motor adapted to drive the driving wheel is placed on one of the left and right sides in the vehicle width direction with the shock absorber placed on an another side, the saddle-type vehicle according to the present invention can improve stability of the vehicle body by optimizing an arrangement of the driving parts and suspension parts.

The nature and further characteristic features of the present invention will be described hereinafter in the following descriptions made with reference to the accompanying drawings, and the other advantages effects and functions of the present invention will be also made clear hereinafter.

DETAILED DESCRIPTION

Hereinbelow, a description will be given of a saddle-type vehicle according to embodiments of the present invention with reference to the drawings.

[First Embodiment]

Figure 1:
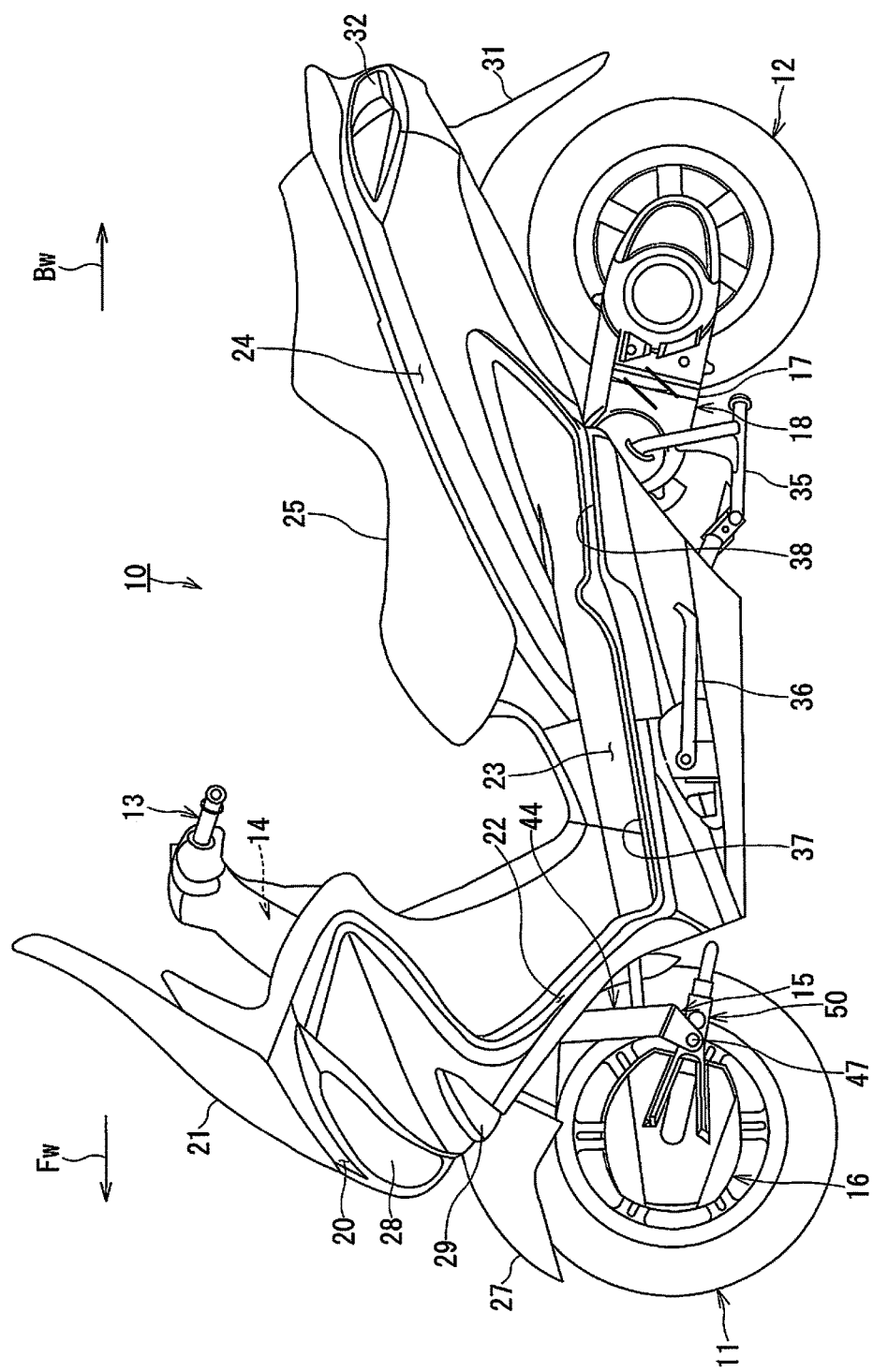
FIG. 1 is a left side view showing an overall external shape of a saddle-type vehicle according to a first embodiment of the present invention.
Figure 2:
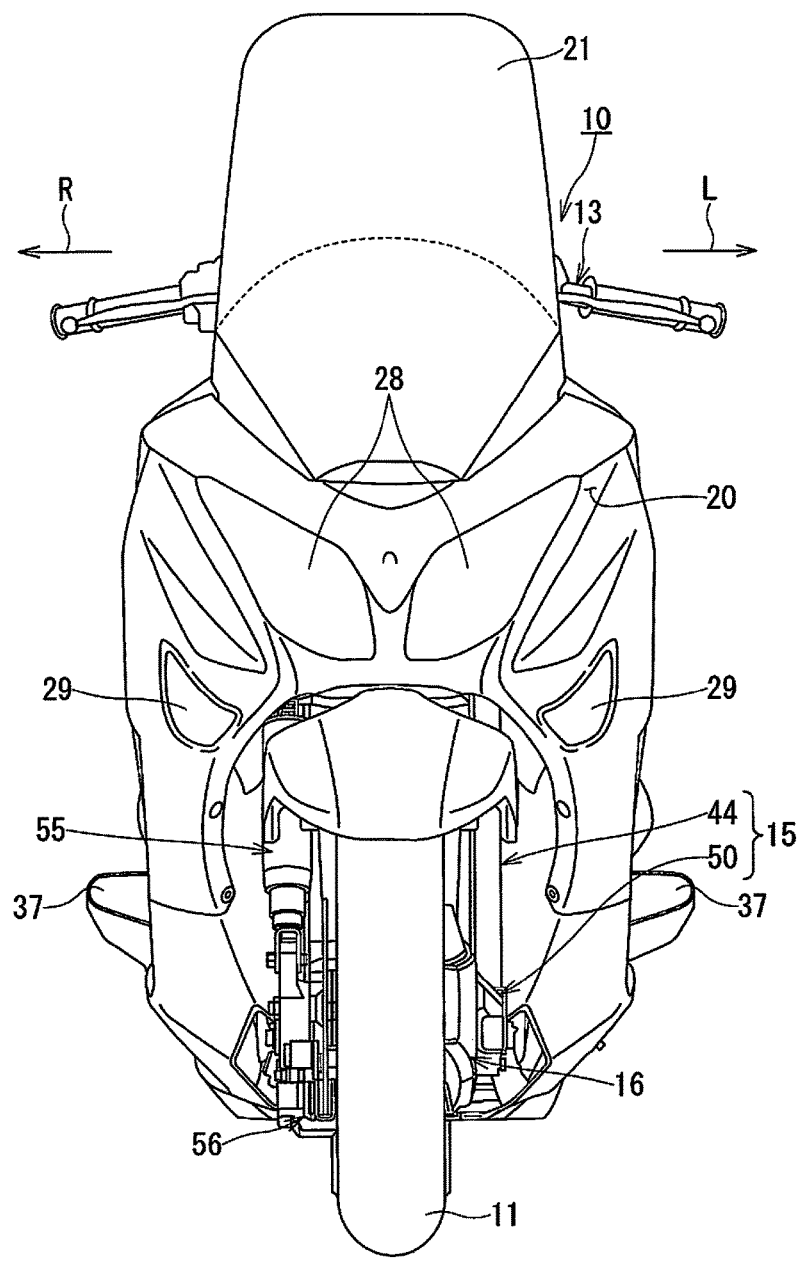
FIG. 2 is a front view of the saddle-type vehicle shown in FIG. 1 as viewed from the front of the vehicle.
Figure 3:
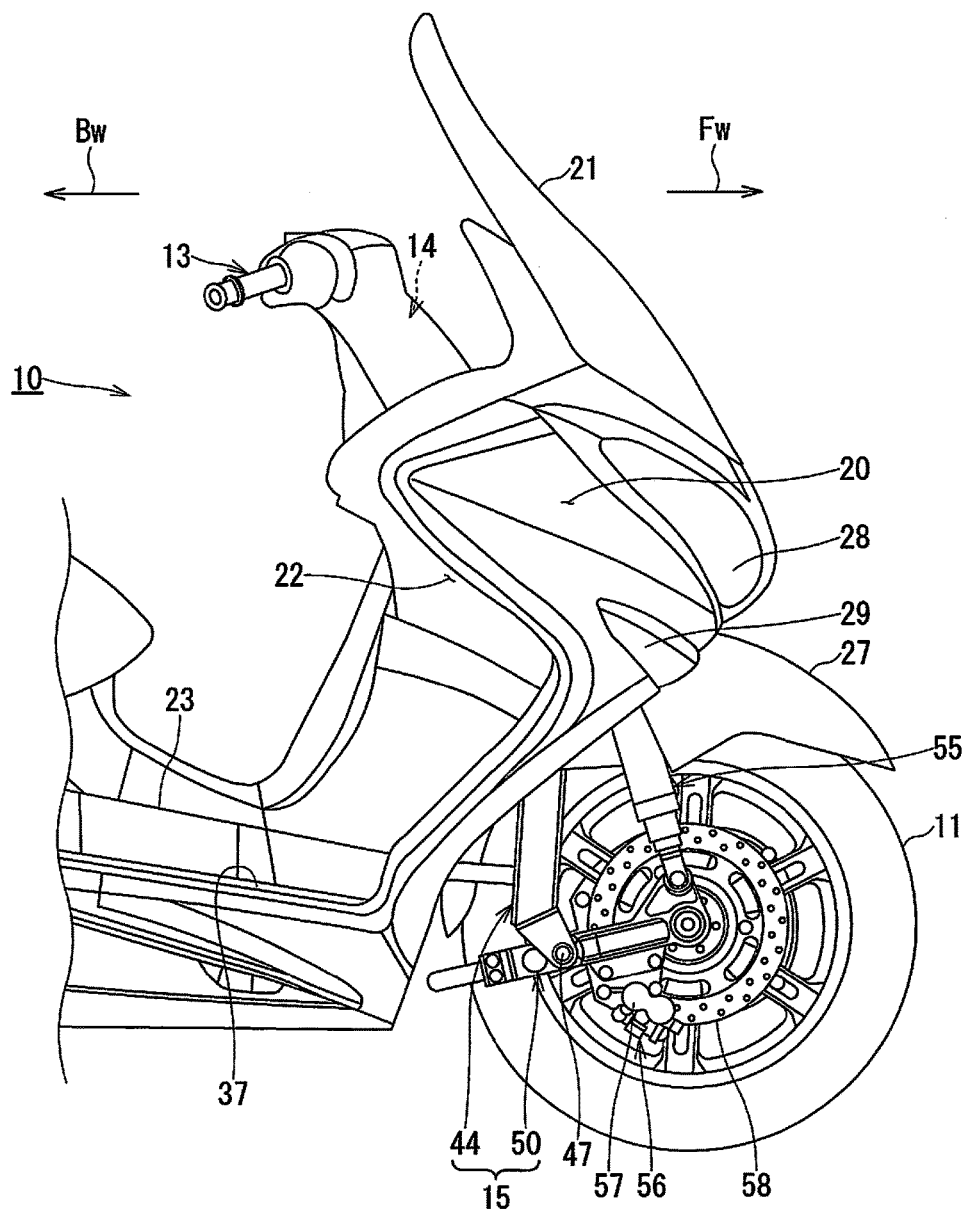
FIG. 3 is a right side view showing a front half of the saddle-type vehicle shown in FIG. 1.

FIG. 1, which shows a saddle-type vehicle according to a first embodiment of the present invention, is a left side view of the entire vehicle, showing an external shape of the saddle-type vehicle; FIG. 2 is a front view of the saddle-type vehicle shown in FIG. 1 as viewed from the front of the vehicle; and FIG. 3 is a right side view showing a front half of the saddle-type vehicle of FIG. 1. In these figures, in relation to the saddle-type vehicle 10, a forward side of the vehicle is denoted by symbol Fw and a rearward (backward) side of the vehicle is denoted by symbol Bw. Also, the left side and right side as viewed by a driver riding the saddle-type vehicle 10 are denoted by symbols L and R, respectively.

[Saddle-Type Vehicle]

The saddle-type vehicle 10 shown in FIGS. 1 to 3 is, for example, a scooter-type motorcycle, in which a front wheel 11 is provided in lower front part of a vehicle body and rear wheel 12 is provided in lower rear part of the vehicle body. The front wheel 11, which is steered by turning a handle 13 via a steering mechanism 14 and link-type suspension system 15 or bottom arm-type suspension system, functions as a steered wheel. The link-type suspension system 15 is provided with a motor 16 adapted to drive the driving wheel and the front wheel 11 serving as a steered wheel also functions as a driving wheel.

On the other hand, the rear wheel 12 functions as a non-steered wheel. The rear wheel 12 is driven by a non-illustrated engine mounted on a vehicle body of the saddle-type vehicle 10. The rear wheel 12, which is a non-steered wheel, also functions as a driving wheel.

Thus, in the saddle-type vehicle 10 of the present embodiment, the steered wheel is the motor-driven front wheel 11 and the non-steered wheel is the engine-driven rear wheel 12. This is a front-and-rear-wheel-driven two wheeled vehicle in which the motor-driven steered wheel assists the engine-driven non-steered wheel. Driving parts of the vehicle include the engine and motor 16 while suspension parts of the vehicle include the link-type suspension system 15 and a shock absorber 55.

The non-illustrated engine is mounted on the vehicle body of the saddle-type vehicle 10 shown in FIG. 1. A driving force of the engine is transmitted to a wheel axle of the rear wheel 12 via a power transmission system (also not illustrated), and the rear wheel 12 is driven by the engine. The non-steered, rear wheel 12 functions as a driving wheel, assisting the motor-driven steered wheel.

On the non-steered, rear wheel 12, a swing arm 17 is swingably supported at a bottom center of the vehicle body of the saddle-type vehicle 10 via pivots. The swing arm 17 is installed on a body side of saddle-type vehicle 10 swingably around the pivots. The swing arm 17 makes up a link-type suspension system 18 or bottom arm-type suspension system adapted to support the non-steered, rear wheel 12. Note that the swing arm 17 may be made up of a unit swing engine equipped integrally with an engine and power transmission system or made up of a power unit by installing the engine on upper front part of the arm.

A cowling 20 serving as a vehicle head cover is installed in front part of the saddle-type vehicle 10, and a wind screen 21 is installed in upper part of the cowling 20, extending in an upper rear direction. On a rearward side of the cowling 20, a leg shield cover 22, a body side cover 23, and a rear cover 24 cover the vehicle body in sequence, and make up a vehicle body cover covering the entire vehicle body. A seat 25 is installed above the body side cover 23 and rear cover 24.

Furthermore, upper part of the front wheel 11, which is a steered wheel, is covered with a front fender 27 and a head lamp 28 is installed above the front fender 27. Left and right blinkers 29 are installed in lower part on both sides of the head lamp 28.

Upper part of the non-steered, rear wheel 12 is covered with a rear fender 31, and a tail lamp 32 is installed above the rear fender 31.

Note that in FIG. 1, reference numeral 35 denotes a center stand and reference numeral 36 denotes a side stand. Reference numeral 37 denotes a rider step and reference numeral 38 denotes pillion step.

[Vehicle Front Structure]

Figure 4:
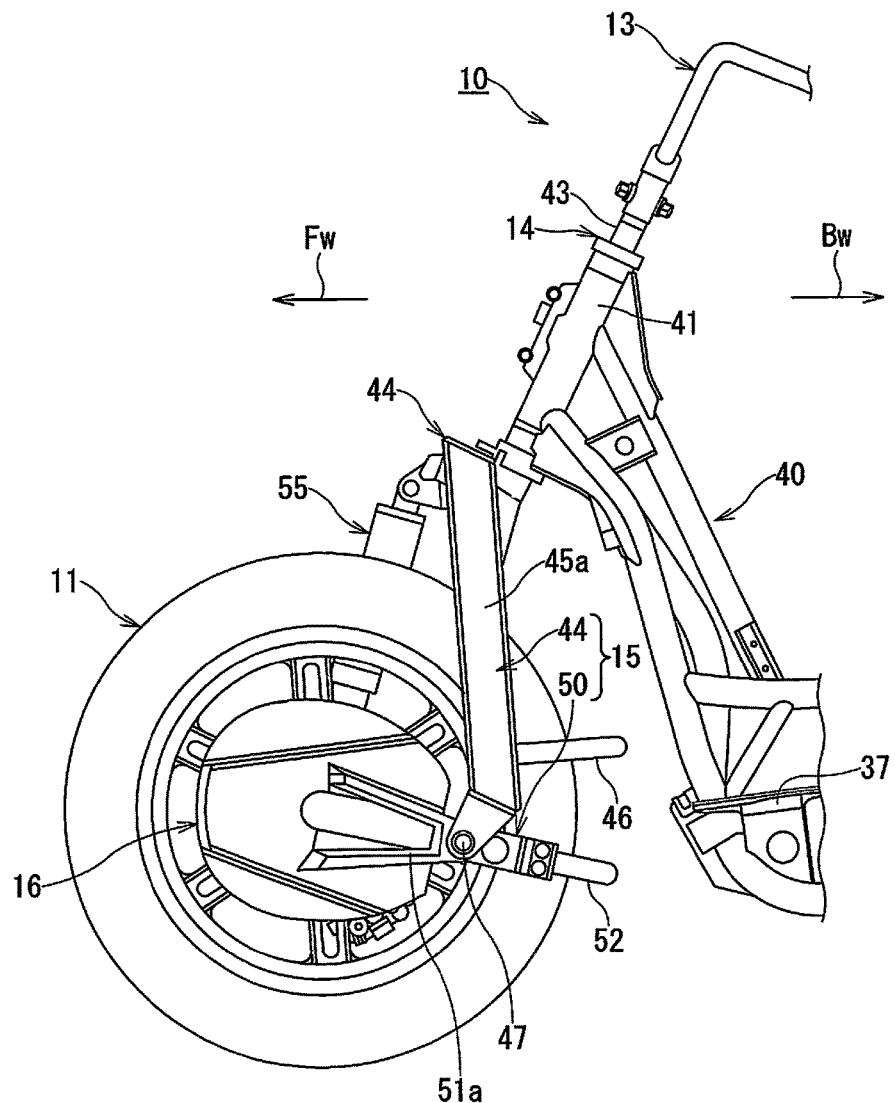
FIG. 4 is a left side view showing a body frame structure in the front half of the saddle-type vehicle.
Figure 5:
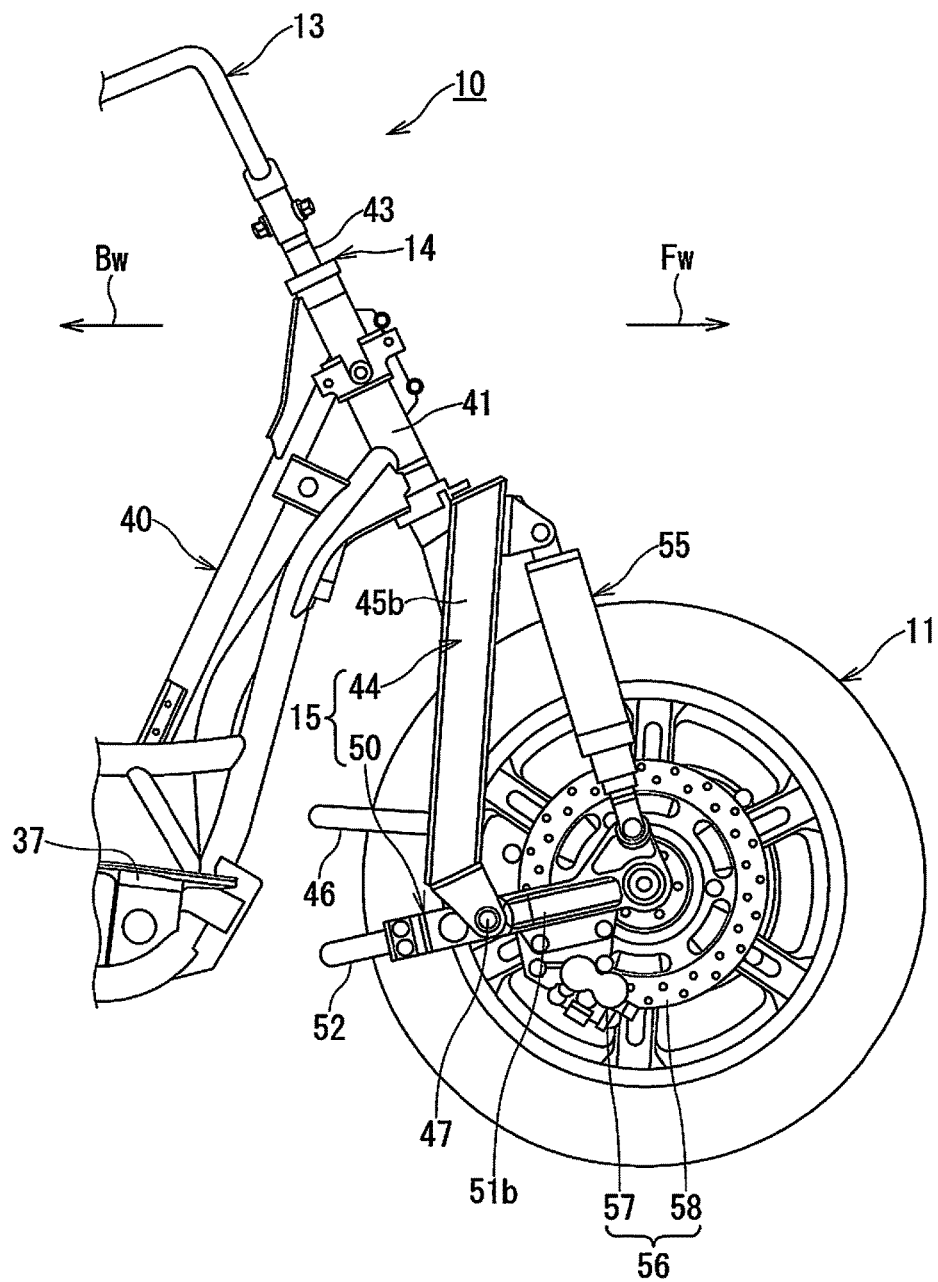
FIG. 5 is a right side view showing the body frame structure in the front half of the saddle-type vehicle.

On the other hand, the front part of the saddle-type vehicle 10 is constructed as shown in FIGS. 4 to 5. In the saddle-type vehicle 10, a head pipe 41 is installed on a front end portion of a body frame 40 having a down frame structure. A steering shaft 43 making up the steering mechanism 14 is rotatably installed in the head pipe 41 and a top of the steering shaft 43 is coupled to the handle 13. The steering mechanism 14 rotatably supports the steering shaft 43 in the head pipe 41. Lower part of the steering shaft 43 is coupled with the front fork 44 in lower part of the head pipe 41.

The front fork 44 branches into left and right fork legs 45a and 45b, which extend downward, straddling rear part of the front wheel 11, and lower parts of the left and right fork legs 45a and 45b are reinforced by being coupled together integrally by an arc-shaped bridge frame 46, which straddles and thereby detours the rear part of the front wheel 11. The left and right fork legs 45a and 45b of the front fork 44 is made up of a fork member, and is not provided with a telescopic suspension mechanism. The lower parts of the left and right fork legs 45a and 45b are bend in a forward direction of the vehicle, pivots 47 are installed in lower end portions of the left and right fork legs 45a and 45b, and left and right arm portions 51a and 51b of a swing arm 50 are swingably supported by a pair of the left and right pivots 47. Rear end portions of the left and right arm portions 51a and 51b of the swing arm 50 are reinforced by being coupled together integrally by a bridge frame 52, which straddles and thereby detours the rear part of the front wheel 11. Of the link-type suspension system 15 of the steered wheel, the pair of left and right fork legs 45a and 45b of the front fork 44 are coupled together integrally by the bridge frame 46 while the left and right arm portions 51a and 51b of the swing arm 50 are also coupled together integrally by the bridge frame 52. The link-type suspension system 15 is integrated by the upper and lower bridge frames 46 and 52 and the arm portions 51a and 51b of the swing arm 50 supports the front wheel 11, which is the steered wheel. The link-type suspension system 15 makes up a bottom link-type or bottom arm-type support mechanism of the steered wheel.

[Link-Type Suspension System of Steered Wheel]

In the link-type suspension system 15 of the steered wheel, the arm portions 51a and 51b of the swing arm 50 extend from the pivots 47 serving as pivotal fulcrums toward a forward side of the vehicle along opposite flanks of the vehicle, and the front wheel 11 is supported by front end portions of the arm portions 51a and 51b.

In the link-type suspension system 15 of the steered wheel, the front fork 44 is installed on a vehicle body side by being fixed to lower part of the steering mechanism 14 of the saddle-type vehicle 10.

The front fork 44 is bifurcated into left and right branches, and the fork legs 45a and 45b are fixed to the left and right branches, respectively. The pair of left and right fork legs 45a and 45b extends downward, and lower parts of the fork legs are integrated by being coupled together by the bridge frame 46 to improve mechanical and physical strength and maintain sufficient rigidity.

The left and right arm portions 51a and 51b of the swing arm 50 making up the link-type suspension system 15 of the steered wheel are integrated by being coupled together by the bridge frame 52. The motor 16 is installed as shown in FIG. 4 on the front end portion of one of the left and right arm portions, e.g., the left arm portion 51a. Another arm portion, i.e., the right arm portion 51b, of the swing arm 50 supports a wheel axle of the front wheel 11 as shown in FIG. 5.

Figure 7:
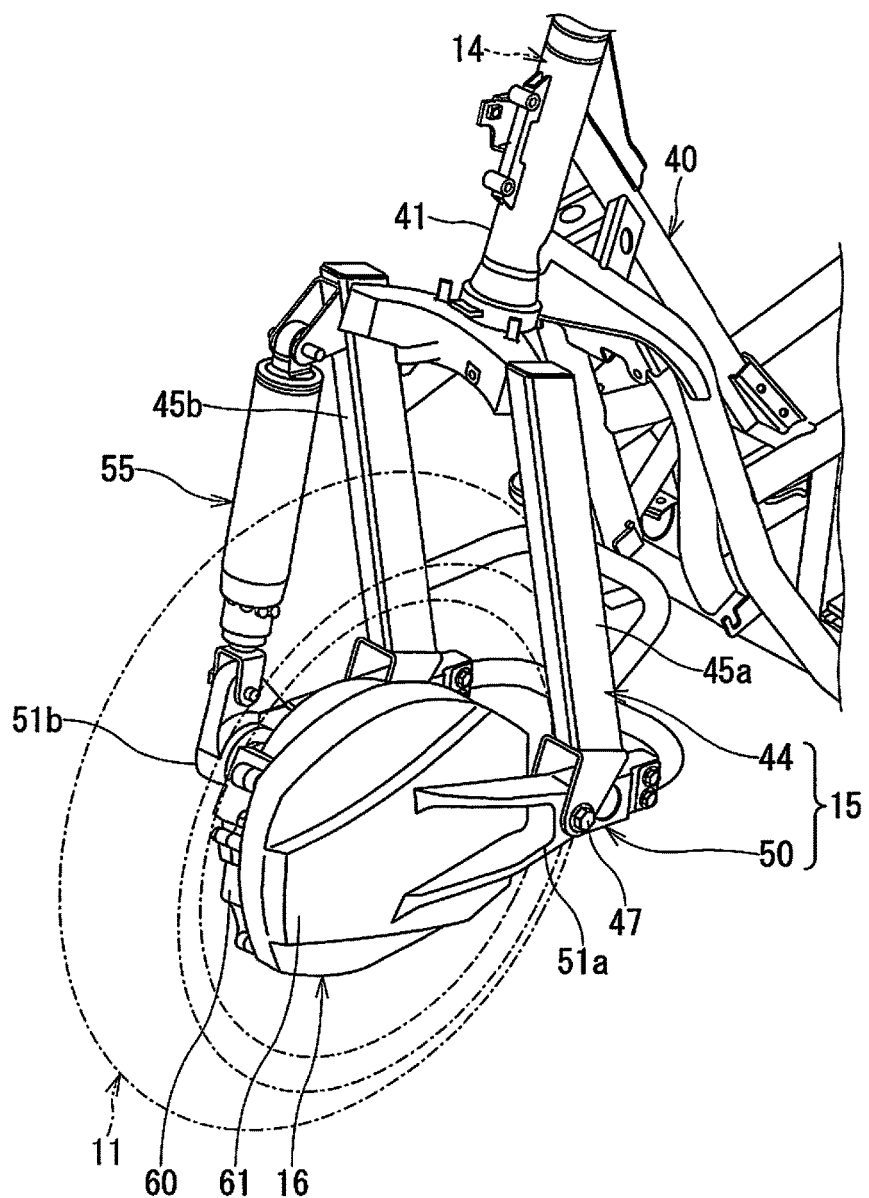
FIG. 7 is a perspective view of the body frame structure in the front half of the saddle-type vehicle as viewed from a left front of the vehicle.

In the saddle-type vehicle 10 of the present embodiment, the front fork 44 making up the link-type suspension system 15 of the steered wheel is configured such that the pair of left and right fork legs 45a and 45b is made up of rod-shaped or frame-shaped a fork member. When the vehicle is viewed laterally, the left and right fork legs 45a and 45b are placed outward of an outer edge of the motor 16, i.e., on a rearward side Bw of the motor 16, as shown in FIGS. 4 and 7. Rigidity is required of the front fork 44. In particular, when the left and right fork legs 45a and 45b of the fork member which needs high rigidity are installed outward of the outer edge of the motor 16, the fork member can be disposed with high rigidity, improving strength without being affected by size, shape, and layout of the motor 16. Moreover, width of the left and right fork legs 45a and 45b of the front fork 44 in the vehicle width direction can be made smaller than width of a conventional telescopic front fork in the vehicle width direction. While keeping the width of the left and right fork legs 45a and 45b in the vehicle width direction compact, driving stability of the front fork 44 can be improved.

The swing arm 50 of the link-type suspension system 15 of the steered wheel is installed as shown in FIGS. 3, 4, and 7 to 9 when the vehicle is viewed laterally. In the swing arm 50, bearing points of the left and right arm portions 51a and 51b on the side of the fork legs 45a and 45b of the front fork 44 i.e., the pivots 47 are placed outward of the outer edge of the motor 16, i.e., on the rearward side Bw of the motor 16. Instead of directly supporting the wheel axle of the steered, front wheel 11, the front fork 44 is placed by being offset from a rotation axis of the steered wheel to the rearward side Bw of the vehicle and the pivots 47 serving as a pivot shaft of the swing arm 50 are placed outward of the outer edge of the motor 16 (on the rearward side of the motor 16). Thus, the steered wheel is not supported directly in lower part of a telescopic front fork as is conventionally the case, and even if the motor 16 is upsized, the wheel axle of the steered wheel can be kept from being increased in width.

The swing arm 50 of the link-type suspension system 15 of the steered wheel is arranged such that the bearing points of the left and right arm portions 51a and 51b on the side of the fork legs 45a and 45b of the front fork 44 i.e., the pivots 47 will be placed outward of the outer edge of the steered, front wheel 11. To swingably support the swing arm 50, the fork legs 45a and 45b of the front fork 44 are placed so as to bring the pivots 47 close to the wheel axle of the steered wheel, while detouring and avoiding the motor 16. Consequently, even when a front shock absorber 55 is placed by being offset only to one of the left and right sides (e.g., right side) of the steered wheel on a side opposite an installation side of the motor 16, torsional support of the steered wheel can be minimized and stability in supporting the steered wheel can be improved.

Furthermore, since the front fork 44 of the link-type suspension system 15 of the steered wheel is disposed so as to extend in a vertical direction by being space away from the wheel axle of the steered wheel (front wheel 11) to the rearward side Bw of the vehicle when viewed in a lateral direction of the vehicle, if the front fork 44 which needs rigidity is installed rearward of the wheel axle of the steered wheel with respect to the vehicle, weight of the front fork 44 can be shifted toward a center of the vehicle body, thereby improving operability.

[Suspension Mechanism and Braking Device]

A mounting bracket is installed, near the wheel axle, in an upper tip portion of one of the left and right arm portion (e.g., the right arm portion 51b) of the swing arm 50 and the front shock absorber 55 is mounted by being suspended between the mounting bracket and a mounting bracket in upper front part of the right fork leg 45b of the front fork 44.

Furthermore, the motor 16 is installed on a left side of the steered, front wheel 11 and the braking device 56 is installed on a right side of the front wheel 11. The braking device 56 includes a brake caliper 57 attached to the right arm portion 51b of the swing arm 50, a brake disc 58 attached to a right wheel hub of the front wheel 11, and a brake pad 59 adapted to pinch the brake disc 58. The braking device 56 performs braking as the brake pad 59 installed on the brake caliper 57 pinches the brake disc 58.

Figure 6:
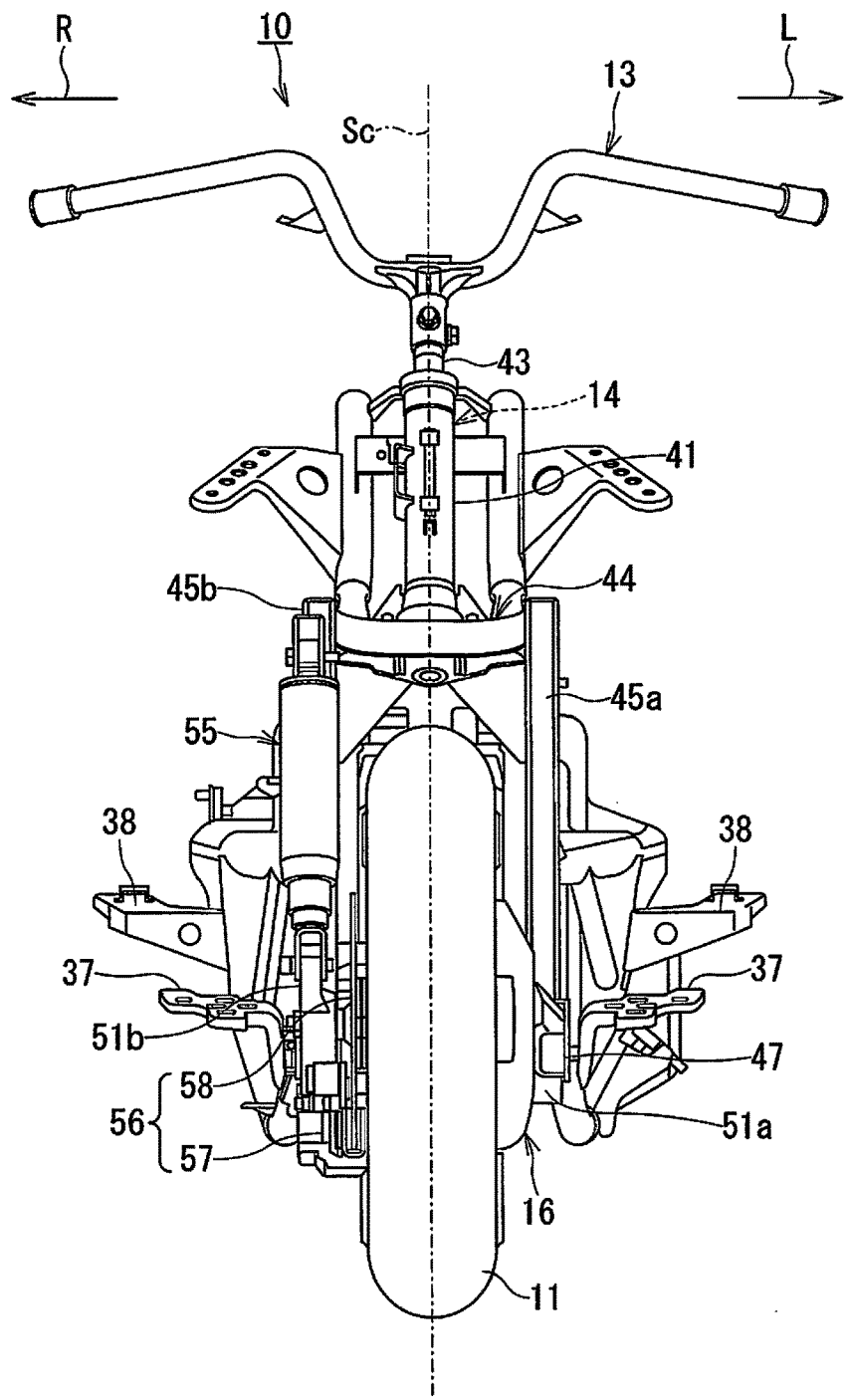
FIG. 6 is a front view of the body frame structure of the saddle-type vehicle as viewed from the front of the vehicle.

In the saddle-type vehicle 10 of the present embodiment, as shown in FIG. 6, the motor 16 heavy in weight is installed on one of the left and right sides of the steered, front wheel 11 (i.e., left and right sides of a steering center axis Sc of the steering shaft 43), e.g., on the left side of the front wheel while the front shock absorber 55 and braking device 56 are installed on an opposite side, i.e., on the right side of the front wheel 11. Of the left and right arm portions 51a and 51b of the swing arm 50, the front shock absorber 55 and braking device 56 are mounted on one arm portion while the motor 16 is mounted on another, making it possible to maintain proper weight balance between the left and right sides of the vehicle.

In particular, it is sufficient to install a single front shock absorber 55 in the right arm portion 51b and there is no need to provide a shock-absorbing mechanism on both left and right fork legs as with the conventional telescopic front fork. Moreover, the front fork 44 is installed rearward of the motor 16 and front shock absorber 55 with respect to the vehicle and there is no need for the pair of left and right fork legs 45a and 45b of the front fork 44 to straddle the motor 16 or front shock absorber 55. This makes it possible to reduce width of the front fork 44 in the vehicle width direction. Besides, since there is no need to install a front shock absorber in the left fork leg 45a, it is possible to improve design freedom of motor parts as well as freedom in placement of the motor 16 installed in the left arm portion 51a of the swing arm 50 and it is easy to maintain left and right weight balance properly around the steering shaft 43.

In addition, since the motor 16 heavy in weight is disposed, for example, on the left side of the front wheel 11 and the braking device 56 (smaller in weight than the motor 16) is installed on the right side of the front wheel 11 together with the single front shock absorber 55, it is easy to balance weight and left and right weight balance can be maintained properly. Consequently, there are not many constraints on the layout and size of the motor 16 and the design freedom of the motor 16 can be improved further. Even if the motor 16 is upsized, the front shock absorber 55 is placed without interfering with the motor 16. This allows stroke length of the shock absorber 55 to be secured sufficiently, resulting in excellent shock absorbency, and improves vehicle body stability and comfort.

Further, since the link-type suspension system 15, which is an assembly of the front fork 44 and swing arm 50, is used to suspend the steered, front wheel 11, there is no need to install a telescopic fork leg equipped with a shock-absorbing mechanism on both left and right sides as with the conventional telescopic front fork. This enables use of a suspension mechanism in which the front shock absorber 55 is placed only on one side of the swing arm 50, e.g., the right arm portion 51b. Therefore, as shown in FIGS. 6 to 9, in the link-type suspension system 15, even if the motor 16 is installed in one arm portion of the swing arm 50, e.g., in the left arm portion 51a, space is available around another arm portion. Thus, the front shock absorber 55 can be placed easily in the another arm portion, e.g., in the right arm portion 51b without interfering with the motor 16.

Compared to the conventional telescopic front fork, in which the motor is sandwiched by suspension mechanisms on left and right sides, in the link-type suspension system 15 of the steered wheel, the front shock absorber 55 needs to be mounted only on one side in the vehicle width direction. Moreover, the steered, front wheel 11 can be supported by the left and right arm portions 51a and 51b of the swing arm 50. Thus, width of the link-type suspension system 15 in the vehicle width direction can be reduced, and consequently, inertia around the steering center axis Sc in steering the handle 13 can be kept down, improving operability.

The front shock absorber 55 needs to be mounted only on one arm portion of the swing arm 50, e.g., on the right arm portion 51b, which increases freedom of a mounting location of the shock absorber 55 on the side of the wheel axle of the front wheel 11, making it easy to optimize layout around the wheel axle.

Figure 8:
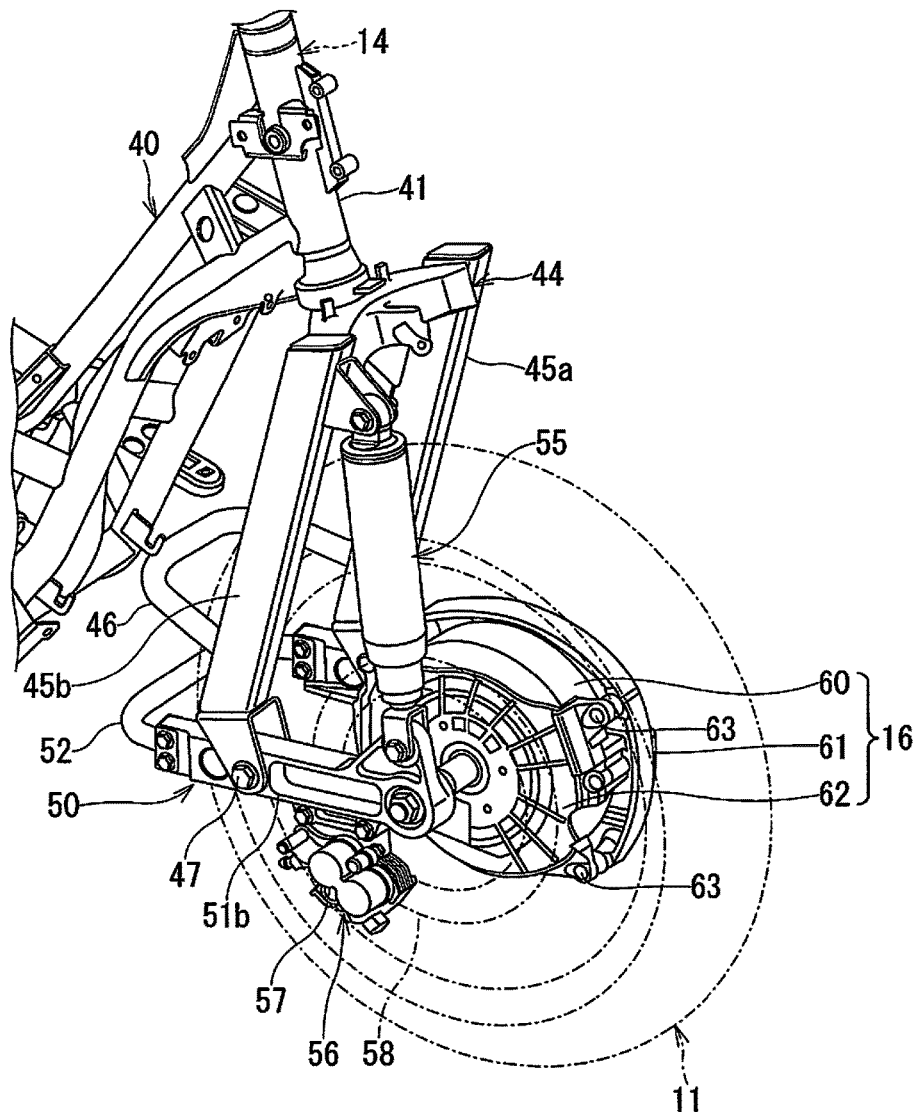
FIG. 8 is a perspective view of the body frame structure in the front half of the saddle-type vehicle as viewed from a right front of the vehicle.

Furthermore, in terms of a mounting location on the side of the wheel axle of the steered wheel, the single front shock absorber 55 can be mounted on the right arm portion 51b of the swing arm 50. Freedom of installation can be improved and layout around the wheel axle can be optimized easily. For example, while achieving the effect of being able to place the single front shock absorber 55 with its mounting location overlapping that of the motor 16 when the vehicle is viewed laterally as shown in FIGS. 4, 7, and 8, if the front shock absorber 55 is placed being spaced away slightly from the wheel axle of the steered wheel, the front shock absorber 55 can be mounted easily by avoiding an occupied area of the motor 16 in the vehicle width direction, making it possible to reduce the width in the vehicle width direction, and thus in a wheel axle direction.

In the saddle-type vehicle 10 of the present embodiment, when viewed in the lateral direction of the vehicle, the mounting location of the single front shock absorber 55 in the another arm portion, e.g., in the right arm portion 51b, is provided inward of the outer edge of the motor 16. Consequently, the motor 16 heavy in weight, the front shock absorber the 55, and the like can be concentrated near the wheel axle of the steered wheel, making it possible to improve operability by reducing inertia during steering.

The braking device 56 is placed together with the single front shock absorber 55 on a side opposite the motor 16, i.e., on the right side of the steered, front wheel 11. Consequently, as shown in FIG. 6, on opposite sides of the steering center axis Sc, as the motor 16 and a motor support structure are placed on one side of the steered, front wheel 11 while the braking device 56 as well as the single front shock absorber 55 are placed on another side of the steered wheel, proper weight balance can be maintained between the left and right sides of the vehicle with the motor 16 heavy in weight being place on one side.

In addition, since the motor 16 mounted on the driving wheel and the braking device 56 are placed on different sides—left and right sides—of the front wheel 11 serving as the driving wheel, even if outside diameter of the motor 16 is increased, there are not many constraints on installation of the braking device 56 and freedom of installation of both the motor 16 and braking device 56 can be improved.

Although the braking device 56 is made up of the brake caliper 57, brake disc 58, and brake pad 59 in the above example, the braking device 56 may be made up of a brake drum, brake shoe and the like.

[Motor Mounting Structure]

Figure 9:
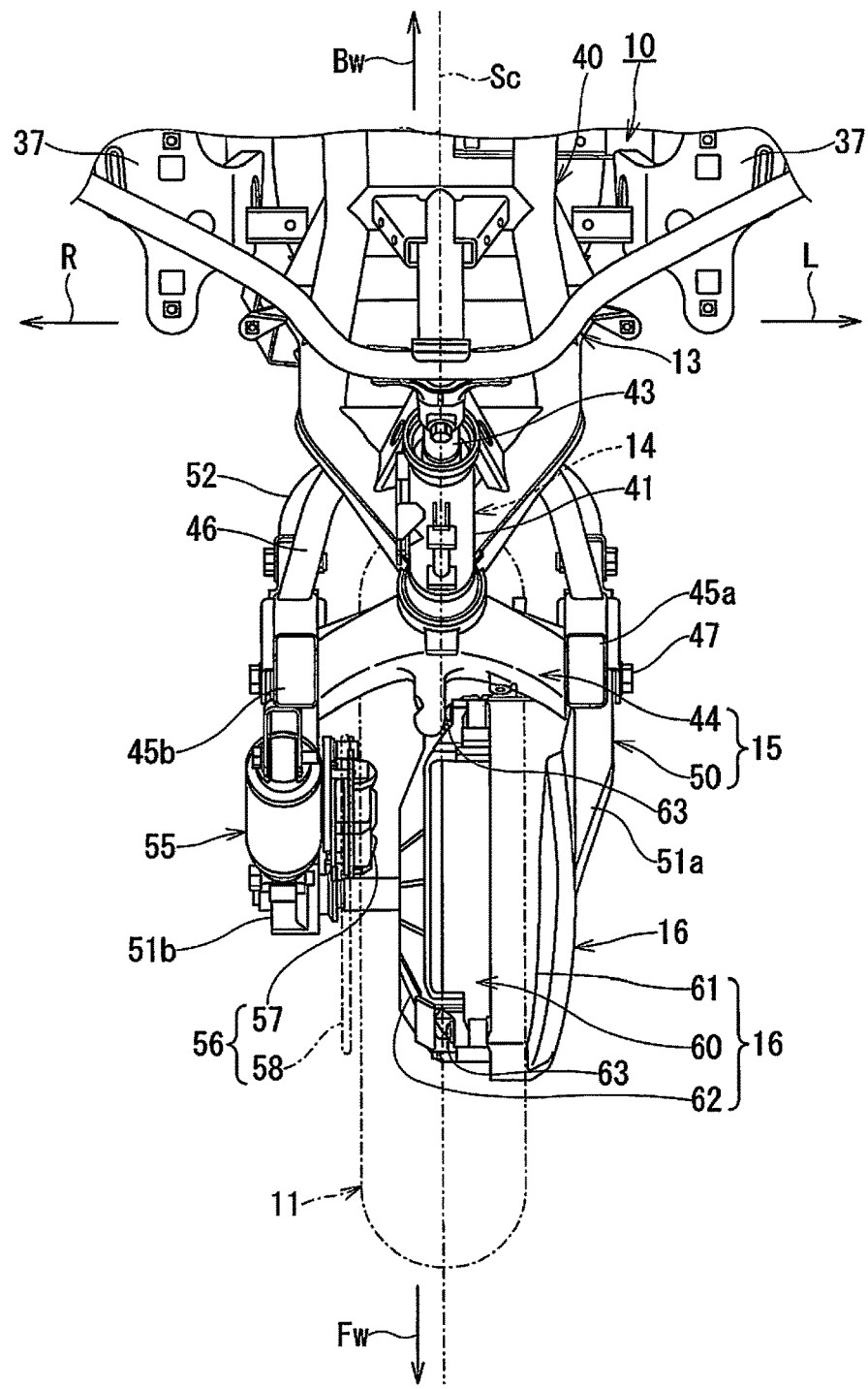
FIG. 9 is a plan view of the body frame structure in the front half of the saddle-type vehicle as viewed from above the vehicle.

As shown in FIGS. 7 to 9, the motor 16 adapted to drive the steered, front wheel 11 is installed on the swing arm 50 of the link-type suspension system 15 provided in lower part of the steering mechanism 14. The motor 16 is mounted on one of the left and right arm portions, e.g., the left arm portion 51a, of the swing arm 50. Of the motor 16 mounted on the left arm portion 51a, a motor body 60 is covered with a cover 61 from outside the vehicle when viewed from a side of the vehicle. The motor cover 61 is integrally fixed to a front end portion of the left arm portion 51a of the link-type suspension system 15 and fixed to the vehicle body side via the swing arm 50 and front fork 44.

The motor 16 includes the motor body 60, the motor cover 61, and an inner cover 62, where the inner cover 62 is integrated into the motor 16 by being fastened to the motor cover 61 using plural motor mounting bolts 63, with the motor body 60 placed inside. The motor 16 is installed on one of the left and right sides, e.g., on the left side, of the steered, front wheel 11.

[Motor Structure]

Figure 10:
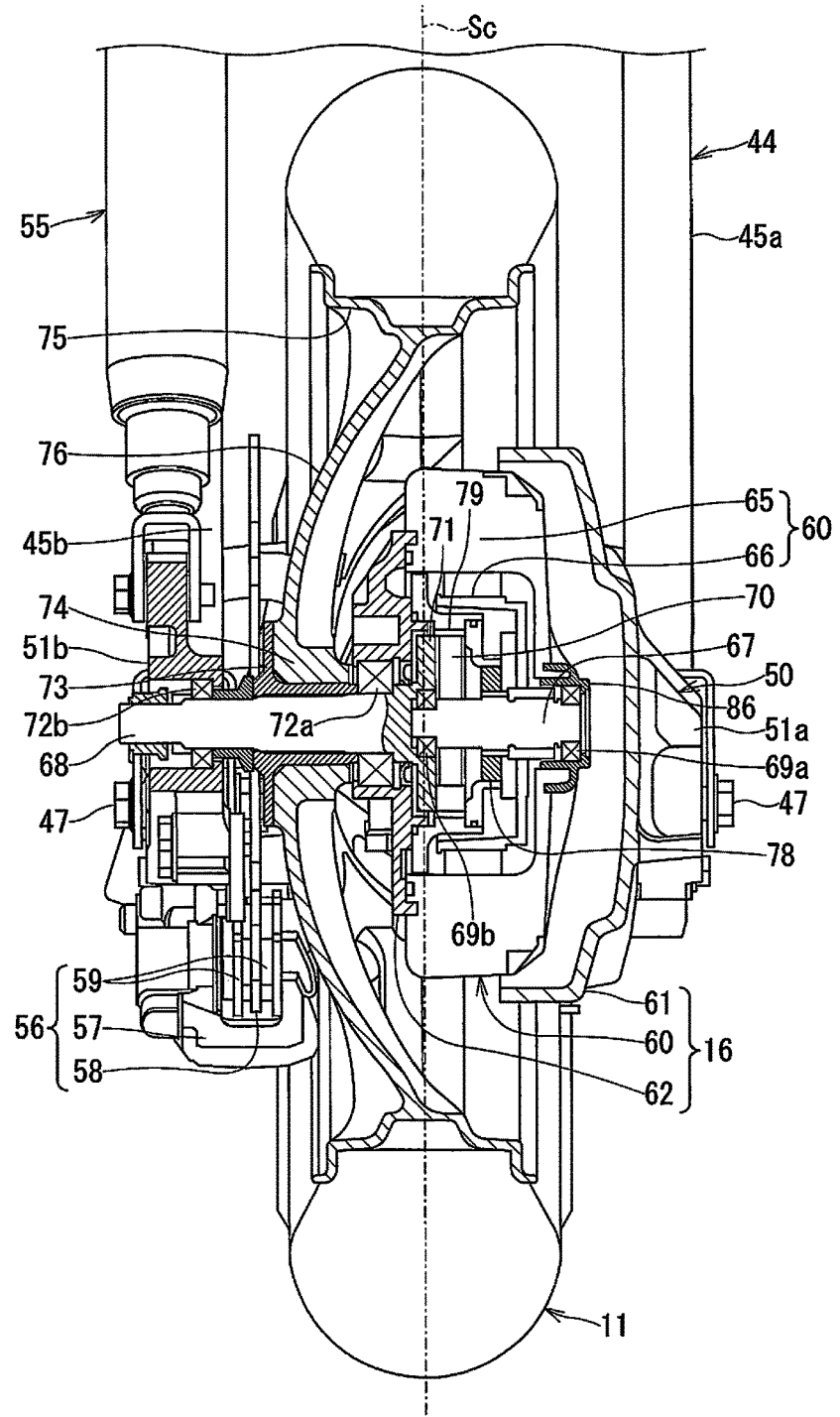
FIG. 10 is a sectional view showing a support structure for a front wheel and motor, where the front wheel is a steered wheel of the saddle-type vehicle.
Figure 11:
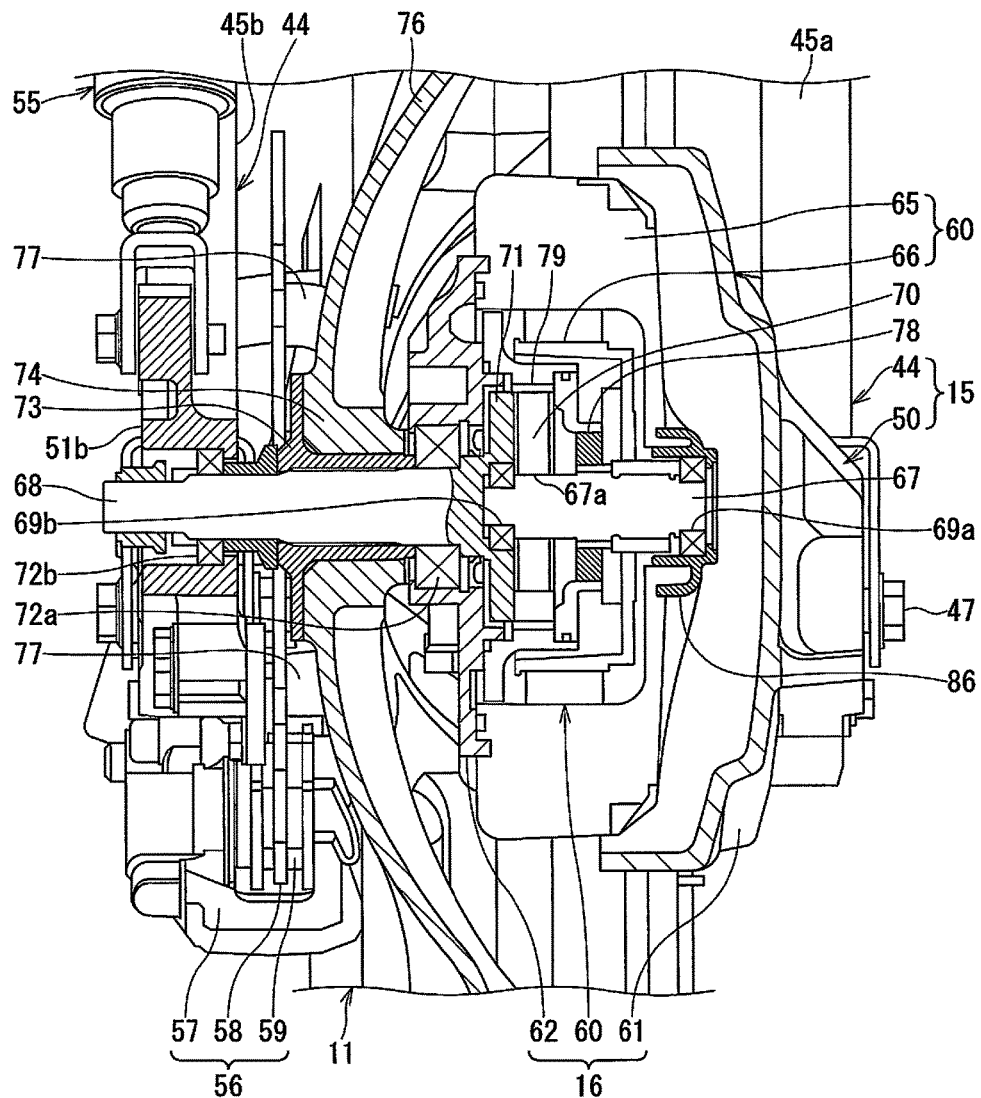
FIG. 11 is an enlarged sectional view showing a cross sectional structure of the motor shown in FIG. 10.

The swing arm 50 is swingably supported in lower part of the link-type suspension system 15 of the steered wheel, and the motor 16 installed in one of the arm portions, e.g., in the left arm portion 51a, of the swing arm 50 is configured as shown in FIGS. 10 and 11. The motor body 60 housed in the motor cover 61 includes a fixed stator 65 and a rotor 66 contained in the stator 65, where the rotor 66 is installed on a motor (inner) shaft 67 in such a way as to be able to rotate integrally with the motor shaft 67. The motor shaft 67 is installed by being adjusted axially so as to share a common axis with the wheel axle 68 of the front wheel 11.

The motor shaft 67 configured to be able to rotate integrally with the rotor 66 is rotatably supported on opposite sides in an axial direction by bearings 69a and 69b. The motor shaft 67 of the motor 16 has a sun gear portion 67a and meshes with a planet gear 70. The planet gear 70 meshes with a ring gear 79 provided on an outer side of the planet gear 70 and configured to be stationary. Being installed integrally with a motor-side end portion of the wheel axle 68, a planet gear carrier 71 rotatably holds the planet gear 70 and rotates coaxially with the motor shaft 67 along with rotary motion of the planet gear 70 around the motor shaft 67. The wheel axle 68 is also rotatably supported on opposite sides in an axial direction by bearings 72a and 72b and the wheel axle 68 and motor shaft 67 are configured to be able to rotate relative to each other via the bearing 69b.

Then, a rotational driving force of the rotor 66 generated as the motor 16 operates is transmitted from the motor shaft 67 to the wheel axle 68 with its speed reduced by the planet gear 70, and then transmitted to a wheel hub 74 via a power transmission member 73 to drive the front wheel 11. Therefore, the front wheel 11 which is a steered wheel is also a driving wheel driven by the motor 16. The motor 16 is operated, for example, to assist the engine.

As shown in FIGS. 10 and 11, a wheel spoke 76 linking a wheel rim 75 and wheel hub 74 of the front wheel 11 is curved, for example, into an arc shape as a whole, and the motor 16 is installed in a curved recess of the wheel spoke 76. A boss 77 is formed on the wheel spoke 76 or wheel hub 74, projecting outward from the front wheel 11, and a brake disc 58 is mounted on the projecting boss 77 and fixed thereto. Note that reference numeral 78 denotes an oil seal.

[Link-Type Suspension System of Non-Steered Wheel]

In the saddle-type vehicle 10 of the present embodiment, the rear wheel 12, which is a non-steered wheel, functions as a driving wheel driven by the engine as shown in FIG. 1. The non-steered, rear wheel 12 is supported by being swingably suspended by a bottom arm-type suspension system or link-type suspension system 18. The link-type suspension system 18 of the non-steered wheel includes the swing arm 17 swingably supported around pivots (not illustrated) in lower center part of the vehicle body of the saddle-type vehicle 10. The swing arm 17 extends to the rearward side of the vehicle and supports and suspends the non-steered, rear wheel 12 in a rear end portion.

The swing arm 17 of the link-type suspension system 18 branches halfway into left and right arm portions, and the rear wheel is supported in rear end portions of the left and right arm portions. In the saddle-type vehicle 10, the non-illustrated engine is suspended by the body frame under the seat 25. The driving force of the engine is transmitted to the rear wheel 12 via a power transmission system such as a chain mechanism to drive the rear wheel 12. In this sense, the engine-driven rear wheel 12 is a driving wheel as well as a non-steered wheel. Note that the engine may be installed in upper front part of the swing arm 17. When the engine is installed in the swing arm 17, the driving force of the engine is transmitted to the rear wheel 12 via the power transmission system of a stepless transmission mechanism and reduction gear mechanism. The swing arm 17 is constructed as a unit swing engine or power unit.

A single rear shock absorber (not illustrated) is installed between one of the left and right arm portions of the swing arm 17 and the body frame 40.

Furthermore, in the saddle-type vehicle 10 of the present embodiment, the rear wheel 12 may be configured to be motor-driven rather than being engine-driven. When the rear wheel 12 is configured to be motor-driven, for example, the motor is installed in one of the arm portions of the swing arm 17 and a single rear shock absorber is installed between another arm portion and the vehicle body. As shown in FIG. 9, the motor is installed such that a center of gravity of the motor is located on one of the left and right sides, e.g., on the left side, of a vehicle body center line BCL in the vehicle width direction, and the single rear shock absorber and the braking device are installed on an opposite side, i.e., on the right side.

[Second Embodiment]

Figure 13:
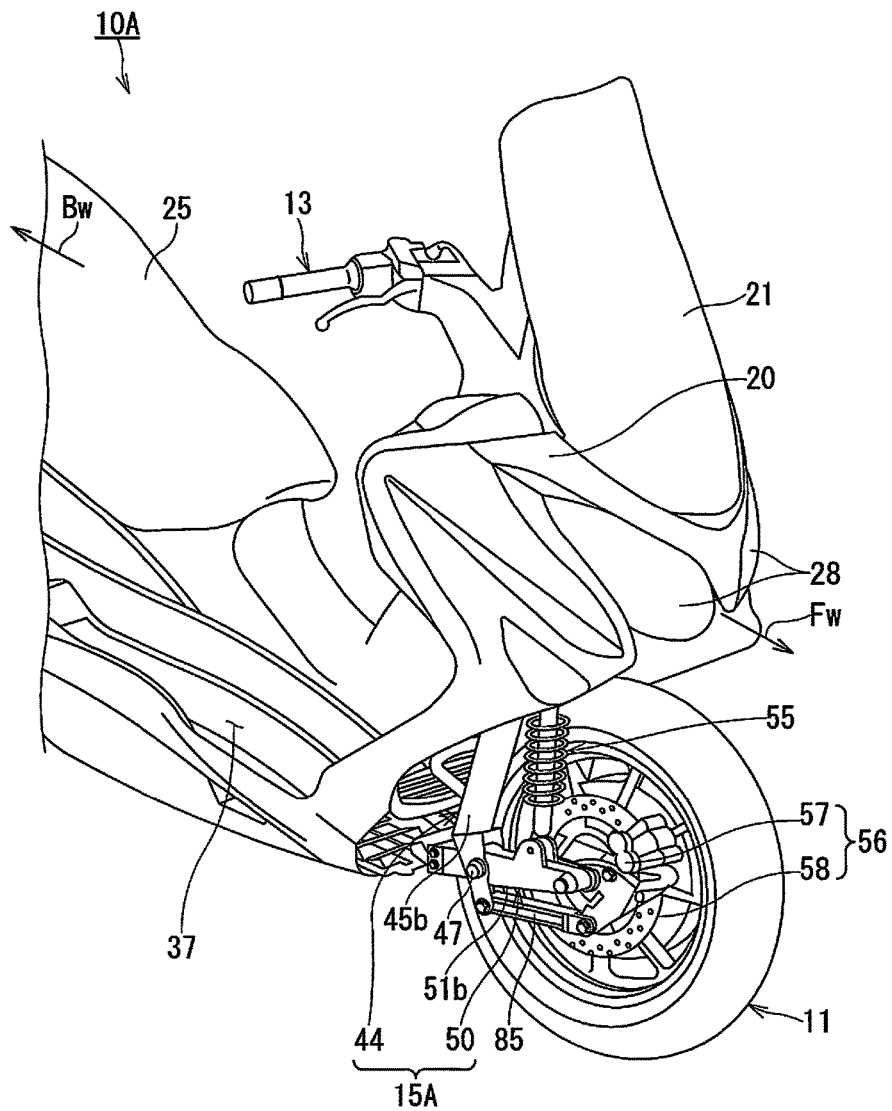
FIG. 13 is a perspective view of the saddle-type vehicle according to the second embodiment as viewed from a right front of the vehicle.
Figure 14:
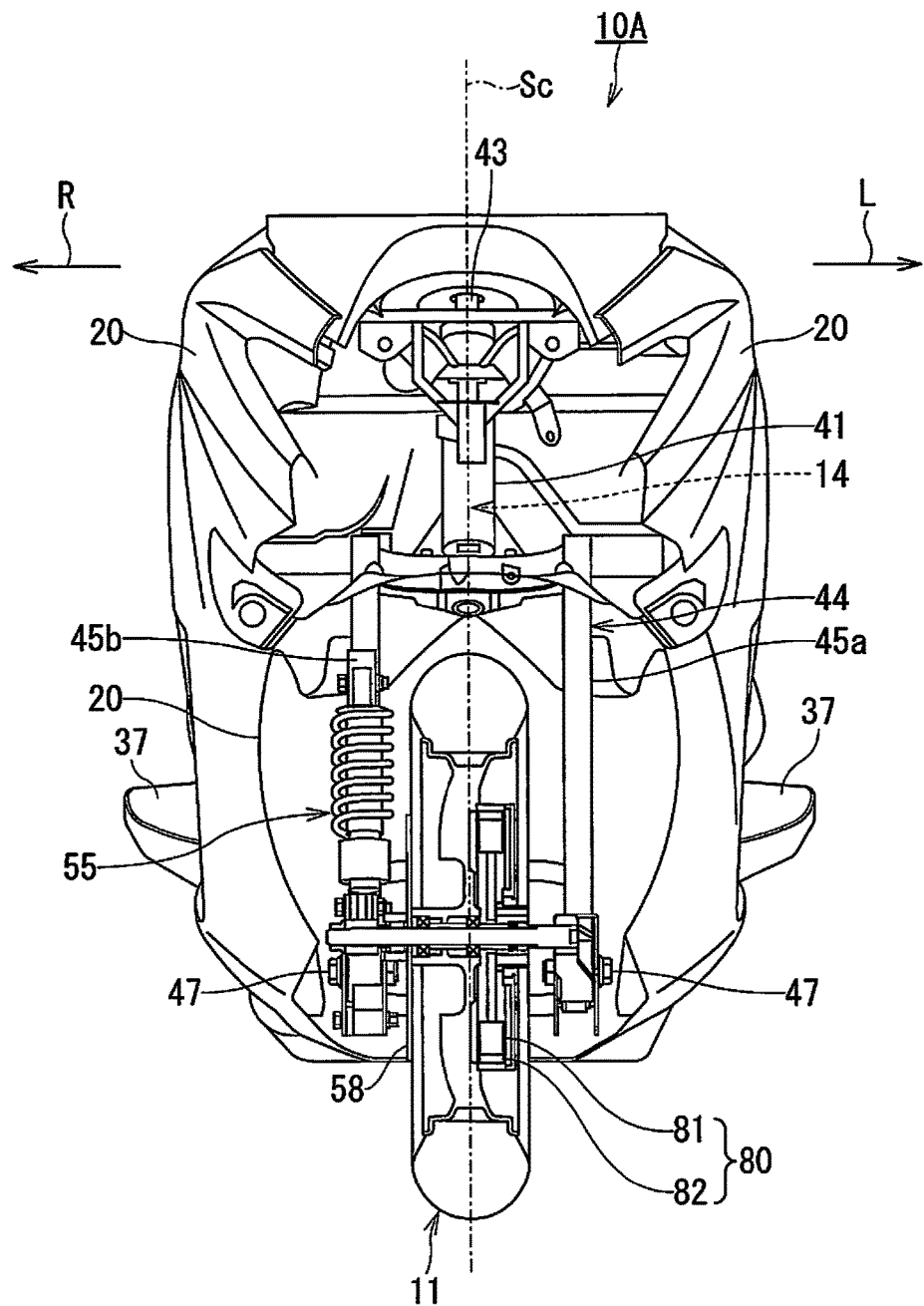
FIG. 14 is a front view of the saddle-type vehicle according to the second embodiment as viewed from the front of the vehicle, where part of the vehicle is shown in a cross sectional structure.

Next a second embodiment of the present invention will be described below with reference to FIGS. 12 to 14.

Figure 12:
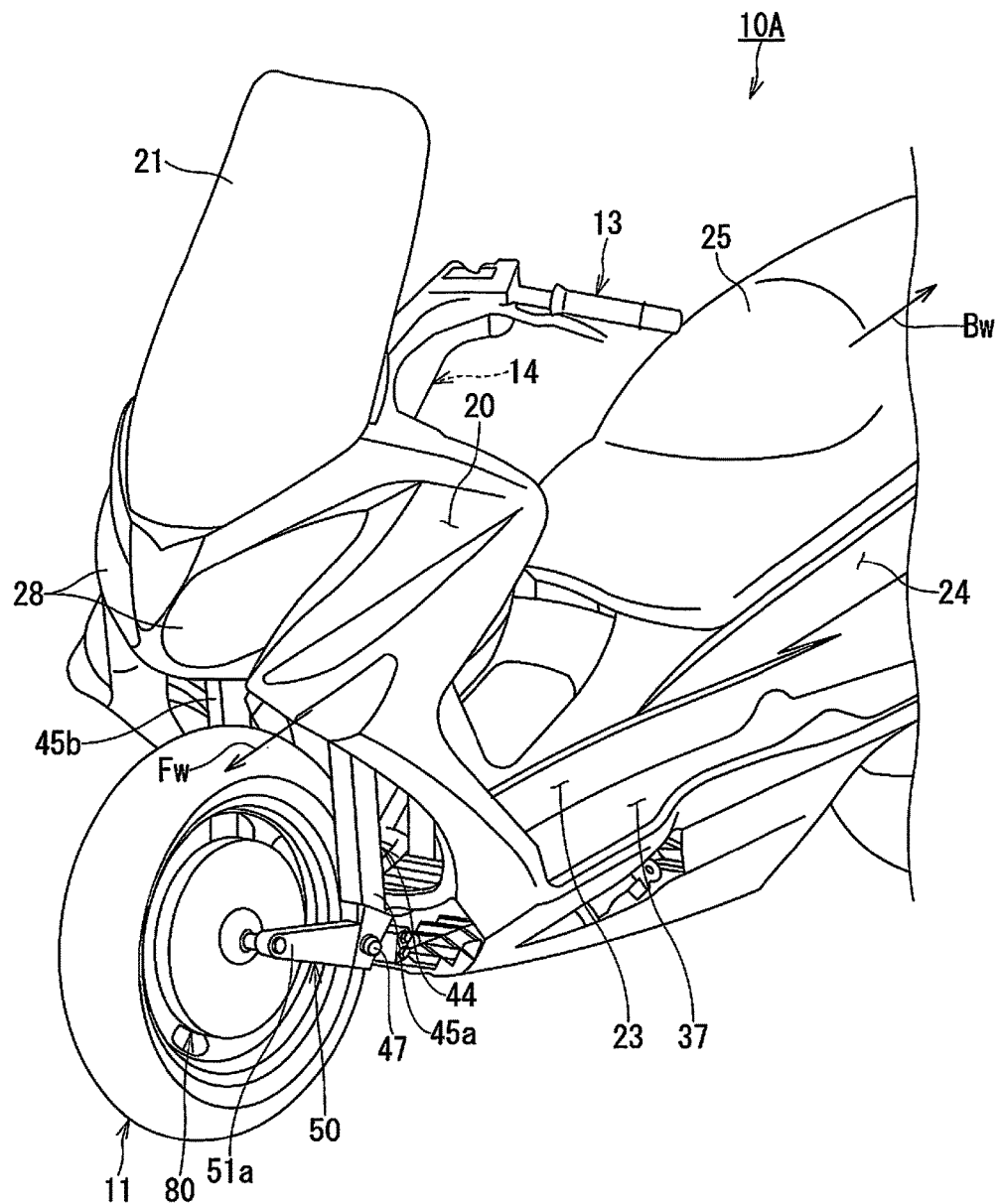
FIG. 12 is a perspective view of a saddle-type vehicle according to a second embodiment of the present invention as viewed from a left front of the vehicle.

FIG. 12 is a perspective view of a saddle-type vehicle according to the second embodiment as viewed from a left front of the vehicle, with side mirrors and a front fender removed; FIG. 13 is a perspective view of the saddle-type vehicle as viewed from a right front of the vehicle, with the front fender and the like removed; and FIG. 14 is a front view also showing the saddle-type vehicle according to the second embodiment as viewed from the front of the vehicle, where part of the vehicle is shown in a cross sectional structure. In FIGS. 12 to 14, the same components as those in the saddle-type vehicle according to the first embodiment are denoted by the same reference numerals as the corresponding components in the first embodiment and redundant description thereof will be omitted.

In the saddle-type vehicle 10A of the second embodiment, a motor 80 installed in the steered, front wheel 11 differs in motor structure from the motor 16 shown in the first embodiment. The motor 80 includes a rotor 82 placed on an outer circumferential side of a stator 81 and fixed and supported on a wheel side of the steered, front wheel 11. The stator 81 placed on an inner circumferential side of the rotor 82 is fixed to the left arm portion 51a of the swing arm 50 of the link-type suspension system 15A of the steered wheel.

Similarly, in a link-type suspension system 15A of the steered wheel, a fixed link 85 is installed side by side with the right arm portion 51b of the swing arm 50 and the brake caliper 57 of the braking device 56 is fixed to an end bracket of the fixed link 85. Thus, the braking device 56 is fixed to the fixed link 85 as well as to the mounting bracket on the right arm portion 51b to strengthen fixing.

In the saddle-type vehicle 10A shown in the second embodiment, the link-type suspension system 15A of the steered wheel is similar in configuration to the link-type suspension system 15 shown in the first embodiment in that the steered wheel is suspended by a bottom link-type or bottom arm-type support structure, but the motor 80 is placed on an outer circumferential side by being fixed to the wheel side of the steered wheel, the stator 81 is placed on an inner circumferential side of the motor 80. The motor 80 differs from the motor 16 according to the first embodiment in that the motor 80 has a motor structure in which the rotor 82 is disposed on the outer circumferential side while the stator 81 is disposed on the inner circumferential side.

In the saddle-type vehicle 10A of the second embodiment, the link-type suspension system 15A of the steered wheel installed below the steering mechanism 14 in the front part of the vehicle provides same operation and effects as the link-type suspension system 15 of the first embodiment.

Although in the examples described in the embodiments of the present invention, the motor output shaft is placed coaxially with the driving wheel, the motor output shaft does not necessarily has to be coaxial with the driving wheel. Operation and effects equivalent to those of the present invention can be obtained as long as the center of gravity of the motor is displaced from the steering center axis, and thus the mounting location of the motor has a high degree of freedom.

Although in the example described above, the braking device 56 is mounted on the right arm portion of the front wheel 11 which is a steered wheel, the braking device 56 may be mounted on the arm portion on the opposite side.

Furthermore, although in the examples described in the embodiments, the saddle-type vehicle is a scooter-type motorcycle, the saddle-type vehicle is also applicable to off-road type motorcycles, on-road type motorcycles, and three-wheeled motorcycles with two rear wheels.

The above-mentioned embodiments are presented as examples only, and not intended to limit the scope of the inventions. The embodiments described herein may be embodied in various forms including three wheel vehicles; furthermore, omissions, substitutions and changes of the present embodiments may be made without departing from the spirit of the inventions. The accompanying claims and their equivalents are intended to cover such modifications as would fall within the scope of the inventions.

The invention claimed is:

1. A vehicle, configured such that an operator thereof, rides on a saddle seat thereupon, the vehicle comprising:
   a swing arm configured to make a vehicle support a driving wheel; and
   a motor configured to rotate the driving wheel,
   wherein:
   the swing arm has left and right arm portions that swingably support the driving wheel;

the motor is placed on one of left and right sides of center of the driving wheel in a width direction of the vehicle; and a shock absorber is mounted on one of the left or right arm portions of the swing arm such that the shock absorber is positioned only on a side opposite to the motor with respect to the center of the driving wheel in the width direction of the vehicle, wherein a mounting location of the shock absorber in the arm portion is provided inward of an outer edge of the motor when the vehicle is viewed laterally.

2. The vehicle of claim 1, further comprising a link suspension system including the swing arm, wherein the driving wheel driven by the motor is a steered wheel, the link suspension system of the steered wheel includes a steering shaft of a steering mechanism rotatably held to a head pipe of a body frame, wherein a front fork extends downward from below the steering shaft by branching into left and right fork legs, wherein the left and right arm portions of the swing arm are swingably supported by the front fork, and wherein the left and right arm portions of the swing arm rotatably support a wheel axle of the steered wheel.

3. The vehicle of claim 2, wherein a center of gravity of the motor configured to drive the steered wheel is positioned on either the the left or right side of a steering center axis in the width direction of the vehicle, and the shock absorber is provided on the one of the left or right arm portion of the swing arm opposite the side where the center of gravity is located.

4. The vehicle of claim 2, wherein the left and right fork legs of the front fork are arranged extending in a vertical direction by being spaced away from the wheel axle of the steered wheel to a rearward side, and is placed rearward of an outer edge of the motor with respect to the vehicle when the vehicle is viewed laterally.

5. The vehicle of claim 2, wherein the left and right arm portions of the swing arm are swingably supported by the left and right fork legs of the front fork via a pivot located rearward of an outer edge of the motor with respect to the vehicle when the vehicle is viewed laterally.

6. The vehicle of claim 2, wherein the left and right arm portions of the swing arm are swingably supported by the left and right fork legs of the front fork via a pivot located inward of an outer edge of the steered wheel when the vehicle is viewed laterally.

7. The vehicle of claim 1, wherein, when the vehicle is viewed laterally, the mounting location of the shock absorber in the arm portion is provided inward of the outer edge of the motor and is on a side of a pivot of the swing arm with respect to a wheel axle of the driving wheel.

8. The vehicle of claim 1, wherein the motor is provided on the one of the left and right sides of the center of the driving wheel in the vehicle width direction, and a braking device and the shock absorber are provided on the one of the left and right sides so as to be positioned on the side opposite to the motor with respect to the center of the driving wheel in the width direction of the vehicle.

9. A vehicle configured such that an operator thereof, rides on a saddle seat thereupon, the vehicle comprising:
a link suspension system configured to make a vehicle support a driving wheel; and
a motor configured to rotate the driving wheel, wherein:
the driving wheel driven by the motor is a steered wheel;

the link suspension system includes a swing arm having left and right arm portions that swingably support the steered wheel;

the motor is placed on one of left and right sides of a steering center axis in a width direction of the vehicle; and a shock absorber is mounted on one of the left or right arm portions of the swing arm such that the shock absorber is positioned only on a side opposite to the motor with respect to the steering center axis in the width direction of the vehicle, wherein a mounting location of the shock absorber in the arm portion is provided inward of an outer edge of the motor when the vehicle is viewed laterally.

10. A vehicle configured such that an operator thereof, rides on a saddle seat thereupon, the vehicle comprising:
a link suspension system configured to make a vehicle support a driving wheel; and
a motor configured to rotate the driving wheel, wherein:
the driving wheel driven by the motor is a steered wheel;

the link suspension system includes a swing arm having left and right arm portions that swingably support the steered wheel;

the motor is placed on one of left and right sides of a steering center axis in a width direction of the vehicle; and a shock absorber is mounted on at least one of the left and right arm portions of the swing arm such that the shock absorber is at least positioned on a side opposite to the motor with respect to the steering center axis in the width direction of the vehicle, wherein a mounting location of the shock absorber is provided inward of an outer edge of the motor when the vehicle is viewed laterally.

11. A vehicle, configured such that an operator thereof, rides on a saddle seat thereupon, the vehicle comprising:
a link suspension system configured to make a vehicle support a driving wheel; and
a motor configured to rotate the driving wheel, wherein:
the driving wheel driven by the motor is a steered wheel;
the link suspension system includes a swing arm having left and right arm portions that swingably support the steered wheel;
the motor is placed on one of left and right sides of a steering center axis in a width direction of the vehicle;
a shock absorber is mounted on at least one of the left and right arm portions of the swing arm such that the shock absorber is at least positioned on a side opposite to the motor with respect to the steering center axis in the width direction of the vehicle,
wherein:
the link suspension system of the steered wheel includes a steering shaft of a steering mechanism rotatably held to a head pipe of a body frame;
a front fork extends downward from below the steering shaft by branching into left and right fork legs;
left and right arm portions of the swing arm are swingably supported by the front fork;
the left and right arm portions of the swing arm rotatably support a wheel axle of the steered wheel; and
the left and right arm portions of the swing arm are swingably supported by the left and right fork legs of the front fork via a pivot located rearward of an outer edge of the motor with respect to the vehicle when the vehicle is viewed laterally.

\* \* \* \* \*